April 5, 1932. G. E. HOWARD 1,853,002
METHOD OF FEEDING MOLTEN GLASS
Filed June 16, 1927
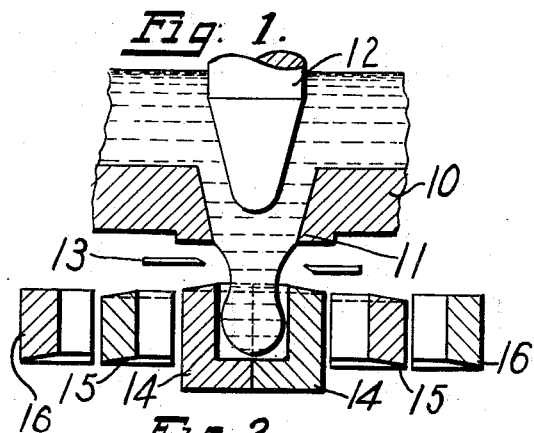
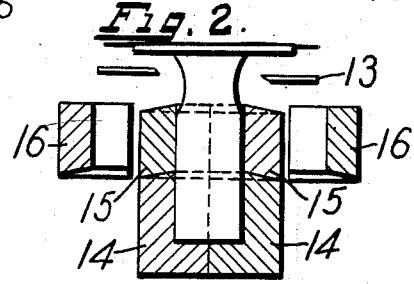
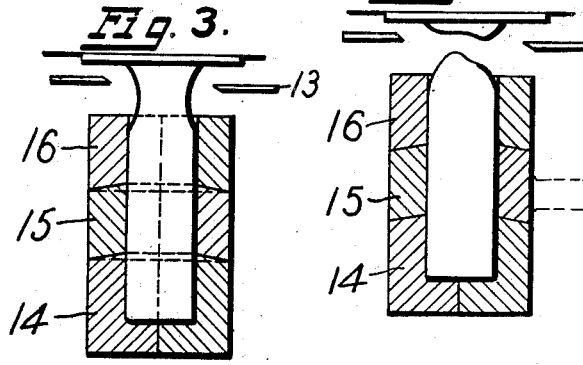
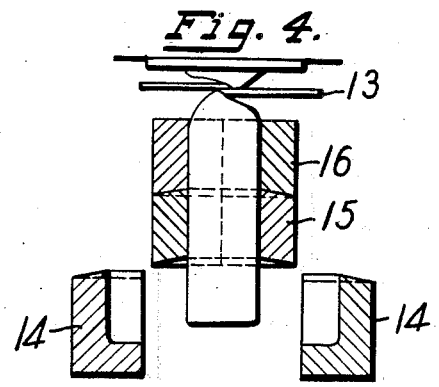
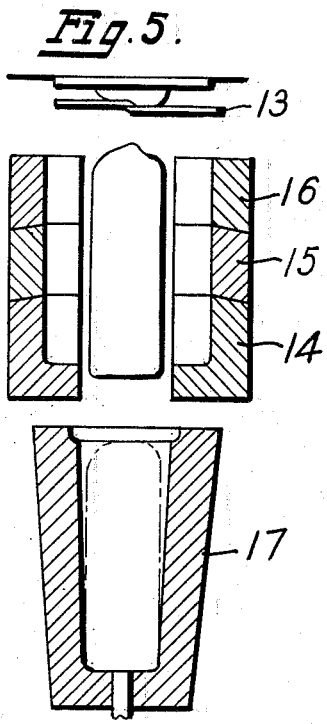
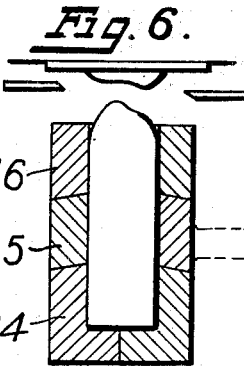
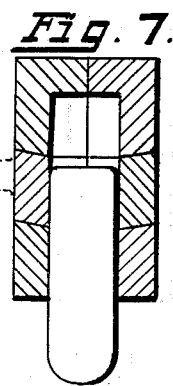
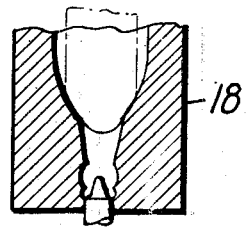
Inventor:
George E. Howard
by Robert D. Brown
Atty.

Patented Apr. 5, 1932

1,853,002

UNITED STATES PATENT OFFICE

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE

METHOD OF FEEDING MOLTEN GLASS

Application filed June 16, 1927. Serial No. 199,243.

My invention relates to feeding molten glass in mold charges by the flowing stream method.

Its principal object is to provide a method whereby a constantly flowing stream of glass, delivered from a glass container, may be prevented from attenuating into a thin stream, and mold charges of uniform weight and shape may be separated therefrom. This object is specifically accomplished by the use of a transfer receptacle or cup comprising a plurality of parts which are successively presented beneath the outlet to control the rate of downward flow of the issued portions of the glass and to impart the desired contour thereto.

It is a well known characteristic of molten glass issuing by gravity from an outlet in a container that as it first issues it tends to assume a globular or rounded form, but as the issue continues the downward movement of the glass first issued is accelerated under the effect of gravity, while the glass later issuing is somewhat retarded by frictional contact with the walls of the orifice and the glass tends to attenuate and form a small continuous stream. In the "flowing stream" method of feeding, it has been the practice to sever such a stream at a substantial distance from the feeder outlet and after severance to present a collecting receptacle to support the glass during mold change. When the mold has been changed, the glass so collected is deposited in the new mold, and on top of this deposit further accumulations of glass are made from the flowing stream. This collection of a charge from a thin stream of glass results in extremely poor quality ware, due to several factors, among them the chilling in atmosphere of the exterior of the thin stream or rope of glass and the coiling and folding of this stream upon itself, thus permeating the mass with chilled streaks and with air bubbles which result in defects in the final ware.

These objections to stream feeding are overcome in the now well known "suspended charge feeding" method by which the passage of glass from an orifice is so controlled, usually by mechanism periodically working within the glass in the container, that masses of glass are formed in suspension from the orifice and severed into the mold charges while in such suspension, these charges being preformed while suspended to approximate in shape the interior of the molds to be charged. The mold charges in this method are delivered en masse instantly to the mold, thus avoiding the objectionable lapping, coiling and folding of the stream feeding method.

The method of my invention combines the use of the continuously flowing stream with many of the advantages of the "suspended charge feeding" method. In general, I provide a container for the glass having a submerged feed outlet having an adjustable throttling means for regulating the rate of flow of glass therethrough. Closely below but spaced from the outlet are provided reciprocating metal shears, properly timed to sever successive equal quantities of glass from the stream issuing from the outlet. I provide a longitudinally split transfer cup which is also divided horizontally into a plurality of sections, so mounted and operated that as a stream of glass issues from the orifice and first tends to attenuate, it is received in and supported at a short distance below the orifice and severing plane by the bottom section of this cup. This section is moved downwardly at a rate approximating or slightly less than the rate of issuance of glass at the outlet, with the result that the normal tendency of the glass to attenuate is overcome, and the stream is caused to swell out slightly after it passes the lower extremity of the orifice. As further portions of the glass pass from the orifice, other sections of the transfer cup are successively brought into play to enclose the stream and impart to it the desired form. When a suitable quantity has issued and thus been received in the transfer cup, the shears sever close to the orifice leaving in the transfer cup a charge of the desired size and shape which, by reason of the method of formation, has an axially symmetrical temperature and viscosity and is free from laps, coils and folds such as are occasioned by the old stream method. This charge is then deposited en masse into the mold of the shaping machine either by inversion of the transfer cup, by a lateral separation of the halves of the sections which form the cup as a whole, or by the lateral separation of the halves of the section which forms the lower portion of the cup.

A further object of my invention is the guiding of severed charges in their delivery to the molds by one or more of the sections of the transfer cup, to assure perpendicular delivery of charges to the mold and to overcome the "batting effect" caused by the severing operation.

The appended drawings diagrammatically illustrate mechanism useful in practicing my novel method. They do not show the mechanism which effects the desired movements of the several parts, as the particular mechanism for effecting such movements forms no part of my invention and may be readily supplied by those skilled in the art. If desired, apparatus generally similar to that disclosed and claimed in my copending application, Serial No. 316,389, filed November 1st, 1928, may be provided for use in operating the sections of the cup in the performance of the methods herein claimed.

In the drawings:

Figure 1 is a diagrammatic sectional view of apparatus employing my new method, illustrating the essential parts in the position they occupy at the stage in forming a charge, at which attenuation of the glass stream is just beginning, and the lower or bottom section of the cup is brought into place to retard the downward movement of the issued glass and to correct its tendency to attenuation;

Figs. 2 and 3 respectively, show further steps in the feeding of the charge started at Fig. 1 showing respectively the application of a second and a third section of the cup to the descending stream of glass;

Fig. 4 illustrates the method at the moment of severance, wherein the halves of the lower or bottom section of the cup have been separated to permit the charge to drop into the mold under the guidance of the upper sections of the cup;

Fig. 5 shows a point in my method immediately after severance and as the charge is moving toward a parison mold of the type particularly used in pressed and blown ware, such as milk bottles, this figure illustrating a modification of Fig. 4 in which the halves of the sections of the entire cup are separated to permit the charge to drop without specific guidance into the mold; and Figs. 6 and 7 illustrate diagrammatically the practice of my invention by apparatus wherein the sectional transfer cup is adapted to be inverted after the severance of the charge to deposit the charge in an inverted mold.

Referring now to Figs. 1 to 4 inclusive, 10 represents the bottom wall of the forehearth or container for molten glass having an orifice 11 submerged by the glass. An adjustable throttling member 12 is provided to control the rate of issue of glass through the orifice. This member is illustrated in Fig. 1 as a plunger of refractory material positioned above the orifice, but it may be of any other suitable form adapted to throttle or control the flow of glass through the orifice. The throttling means is made adjustable to vary its throttling effects, by any well known means. Below and spaced from the orifice are a pair of metal shear blades 13 of any desired construction mounted and driven to periodically close and sever the glass stream flowing from the container. These shears may temporarily support the glass, but are preferably of the type adapted to sever the glass as nearly instantaneously as possible. They may be provided with suitable cooling means, not shown, to prevent their sticking to the glass.

A suitable transfer cup comprising three vertical sections 14, 15 and 16, each vertical section having longitudinally split halves, and the cup as a whole having an interior configuration corresponding to the shape of mold charge desired is suitably mounted and operated to successively close around and control the movement of the issued stream of glass in the order illustrated in Figs. 1, 2 and 3. The transfer cup, after receiving the charge, may be given a rapid downward movement to form an attenuated neck between the cup and the orifice through which the shears 13 may cut, whereupon the halves of the lower or bottom section 14 are separated, as shown in Fig. 4, to permit the charge to drop under the guidance and direction of the closed sections 15 and 16 into the mold. If desired, the halves of the sections of the entire cup may be separated to permit the deposit of the charge in a mold or receptacle 17, as shown in Fig. 5.

In the modification shown in Figs. 6 and 7, the cup may be periodically inverted, following the severance of the charge contained therein from the parent body, to effect the delivery of the charge to the mold when an inverted parison mold 18 is used.

The transfer cup may be made of any suitable material, but I prefer to provide it with a lining of electric brush carbon or other suitable graphite material. The use of such material tends to a more desirable conditioning of the charge.

The operation of the structure shown is as follows—A suitable head of glass is maintained in a forehearth or receptacle 10, the throttling member 12 is set to effect the desired rate of flow of glass through the orifice 11, the transfer cup sections are selected of such size and configuration as to give to a mold charge the size and shape suitable for the molds in which the ware is to be formed, the periodicity of the movements of the shears and the cup sections and their time relation one to the other are suitably selected and regulated for the ware to be made and the feeder set into operation. As the glass first issues from the orifice, it tends to assume a globular shape which is followed shortly by a tendency to attenuation. As this attenuation begins, the halves of the bottom section of the transfer cup 14 are closed about the lower end of the stream, and the descent of the glass retarded thereby. As the attenuation is primarily due to the movement of the already issued glass at a rate in excess of the rate of flow at the orifice, this retardation causes the glass issuing from the orifice to fill out the stream which spreads into contact with the portion 14 of the cup aforesaid. The stream above the cup on further issuance of the glass continues to swell slightly as it receives under support from the previously issued glass by reason of the slower downward movement of the bottom portion 14 of the cup, whereupon the halves of the intermediate section 15 of the cup are brought to position above the section 14 and closed around the issuing stream, causing a portion of the stream to conform to the interior shape of these sections. As the stream continues to flow under the influence of gravity and the retarding force of the downwardly moving cup sections, the halves of the section 16 of the cup are closed about the stream, causing a further portion of the stream to conform to the configuration of these cup sections. When the cup is filled it may be given a quick downward movement to form an attenuated neck, or the shears may be projected through the unattenuated stream to sever the mold charge contained in the transfer cup from the parent mass.

At, immediately after, or just prior to the severing operations, the halves of the lower section 14 of the cup may be separated. The severed mold charge, guided by the still closed sections 15 and 16, or either of them, then may be dropped vertically into its mold.

Instead of separating merely the halves of the lower section 14, the entire cup may be opened, as shown in Fig. 5, or the cup may be inverted, as shown in Figs. 6 and 7, to cause en masse delivery to the mold.

It has been observed that as glass issues from an orifice under the unmodified influence of gravity, it remains "in control", i. e., of a substantial diameter relative to that of the orifice, as it proceeds downwardly for a certain distance only, after which it "breaks out of control", attenuating to the extent of forming a thin stream which laps or folds upon itself when received upon a support spaced below the outlet a distance greater than said certain distance. The distance from the orifice at which control of the stream is lost varies with the type of glass and its viscosity, the size and character of the orifice and the head of glass above the orifice. With glasses commonly used, and with the usual type of orifice now generally in use, this distance may roughly be determined as from two to three and one-half times the diameter of the orifice. I recognize these facts in the practice of my novel method, and provide that the glass shall, at all times during the feeding operation, be supported at a point within this certain distance either by the bottom of the transfer cup or by glass contained in the cup, and so prevent loss of control of stream.

In this application I have shown certain types of transfer cups and other mechanism useful in the practice of my novel method, but it is obvious that numerous modifications of such structure are possible while maintaining the apparatus suitable for the use of my novel method. The appended claims are not to be construed narrowly or with respect to the particular mechanisms illustrated, but are to be as broadly construed as the art will permit.

I claim:

1. The method of feeding molten glass in successive mold charges of similar shape and weight, which comprises flowing glass downwardly in a continuous stream past a severing plane, periodically modifying the rate of flow of the issued glass below the severing plane by a downwardly moving under support to prevent undue attenuation of the stream, successively applying a lateral support to successive portions of the stream for a substantial part of the length of said stream, periodically severing mold charges from said stream, removing the modifying means, and depositing each mold charge en masse in a receptacle.

2. The method of obtaining a mold charge from a stream of glass moving downwardly from an outlet of a glass container, which comprises controlling the rate of downward movement and the shape of the lower end portion of the stream by applying an undersupport to the lower end of the stream and moving said undersupport downward in the line of flow of the stream while in contact with the glass, further controlling the shape of successive portions of the stream above said undersupport by applying successive lateral supports to said stream as the lower end of the stream moves downward under the control of said undersupport, and severing the portion of the stream thus shaped to produce a mold charge.

3. The method of feeding molten glass which comprises flowing glass downwardly in a stream past a severing plane, shaping the stream below the severing plane to conform substantially to the contour of the cavity of a mold to be charged, by first retarding the rate of downward movement of the lower end of the stream below the severing plane and then regulating the cross section of successive portions of the stream below the severing plane by means of a plurality of open ended annular shaping members brought successively into encircling relation to such portions of the stream, severing the stream at said severing plane to produce a mold charge when the stream below the severing plane has attained the desired shape, and delivering the mold charge to said mold.

4. The method of forming a shaped mass of glass which comprises the steps of providing discharge of glass from the source of supply through a downwardly opening outlet, movably supporting the lower end of the discharge glass by providing an undersupport for the glass at a predetermined distance below the outlet and moving said undersupport downwardly at a speed so related to the rate of issuance of glass from the outlet as to aid in shaping the glass above said undersupport, closing a sectional glass confining device about the glass above the undersupport when said undersupport has been moved downwardly a predetermined distance below the outlet to provide walls for limiting the lateral expansion of the glass above said undersupport, and severing the glass in said confining device from the oncoming glass.

5. The method of forming a shaped mass of glass which comprises the steps of providing discharge of glass from a source of supply through a downwardly opening outlet, movably supporting and shaping the lower end of the discharge glass by providing a hollow glass receiving undersupport for the glass at a predetermined distance below the outlet and moving said undersupport downwardly at a speed so related to the rate of issuance of glass from the outlet as to aid in shaping the glass above said undersupport, closing a sectional glass confining device about the glass above the undersupport when said undersupport has been moved downwardly a predetermined distance below the outlet to provide walls for limiting the lateral expansion of the glass above said undersupport, and cutting through the glass above said confining device to separate the glass therein from the oncoming glass.

Signed at Hartford, Connecticut this 9th day of June, 1927.

GEORGE E. HOWARD.